United States Patent [19]

Treiber

[11] 4,054,528

[45] Oct. 18, 1977

[54] SELF-CLEANING STRAINER OR FILTER

[76] Inventor: Kenneth L. Treiber, 1103 Villamay Blvd., Alexandria, Va. 22307

[21] Appl. No.: 727,492

[22] Filed: Sept. 28, 1976

[51] Int. Cl.² .......................................... B01D 35/16
[52] U.S. Cl. .................................. 210/355; 210/415
[58] Field of Search ............................ 210/355, 415

[56] References Cited

U.S. PATENT DOCUMENTS

| 1,993,214 | 3/1935 | Hass | 210/415 X |
| 2,408,741 | 10/1946 | Dodge | 210/355 |
| 2,763,375 | 9/1956 | Shaughessy | 210/492 X |

Primary Examiner—Frank A. Spear, Jr.
Assistant Examiner—Richard W. Burks
Attorney, Agent, or Firm—Nathan Edelberg

[57] ABSTRACT

The disclosure relates to a self-cleaning strainer or filter that has a freely rotatable agitator means mounted within an annular straining element. The agitator means consists of a series of multi-bladed elements of progressively increasing diameter that creates a turbulent flow that prevents material from adhering to the screen.

8 Claims, 3 Drawing Figures

SELF-CLEANING STRAINER OR FILTER

GOVERNMENT USE

The invention described herein may be manufactured, used and licensed by or for the Government for Governmental purposes without the payment to me of any royalties thereon.

This invention relates to fluid straining devices and, in particular, self-cleaning straining devices.

Fluid strainers incorporating cleaning blades and/or sprays have been well known for some time. U.S. Pat. Nos. 1,993,214; 2,678,732; 3,232,436; and 3,349,916 are typical of these prior art strainers which are relatively complex and expensive. Furthermore, in the case of the blade-type cleaners, the blades, when rubbing against the screening element, produced excessive wear while, when slightly spaced, produced frequent jamming by particles lodged between a blade and the screening element.

It is, therefore, an object of this invention to provide a simple and inexpensive self-cleaning strainer or filter.

The above and other objects and advantages, which will be apparent from the detailed description, are achieved by the use of a series of freely rotatable agitator elements which are driven by the fluid flow that produces a sweeping action across the straining element to prevent material adhering to and clogging it.

A more detailed description will now be made with reference to the attached drawings in which:

FIG. 3 is a side elevation of a preferred embodiment agitator element.

The straining device of this invention is useful in any environment where it is desirous to be able to either take off a clean fluid stream from a main impurity carrying stream or separate a liquid constituent from a flowable mass. An example of the former application would be incorporation of the strainer into a cross-country fuel pipeline to enable extraction of clean fuel at various points along the line, while an example of the latter application would be incorporation of the strainer into cheese or paper manufacturing apparatus wherein whey or water components must be removed prior to shaping of the curds or pulp respectively.

Figure 1:
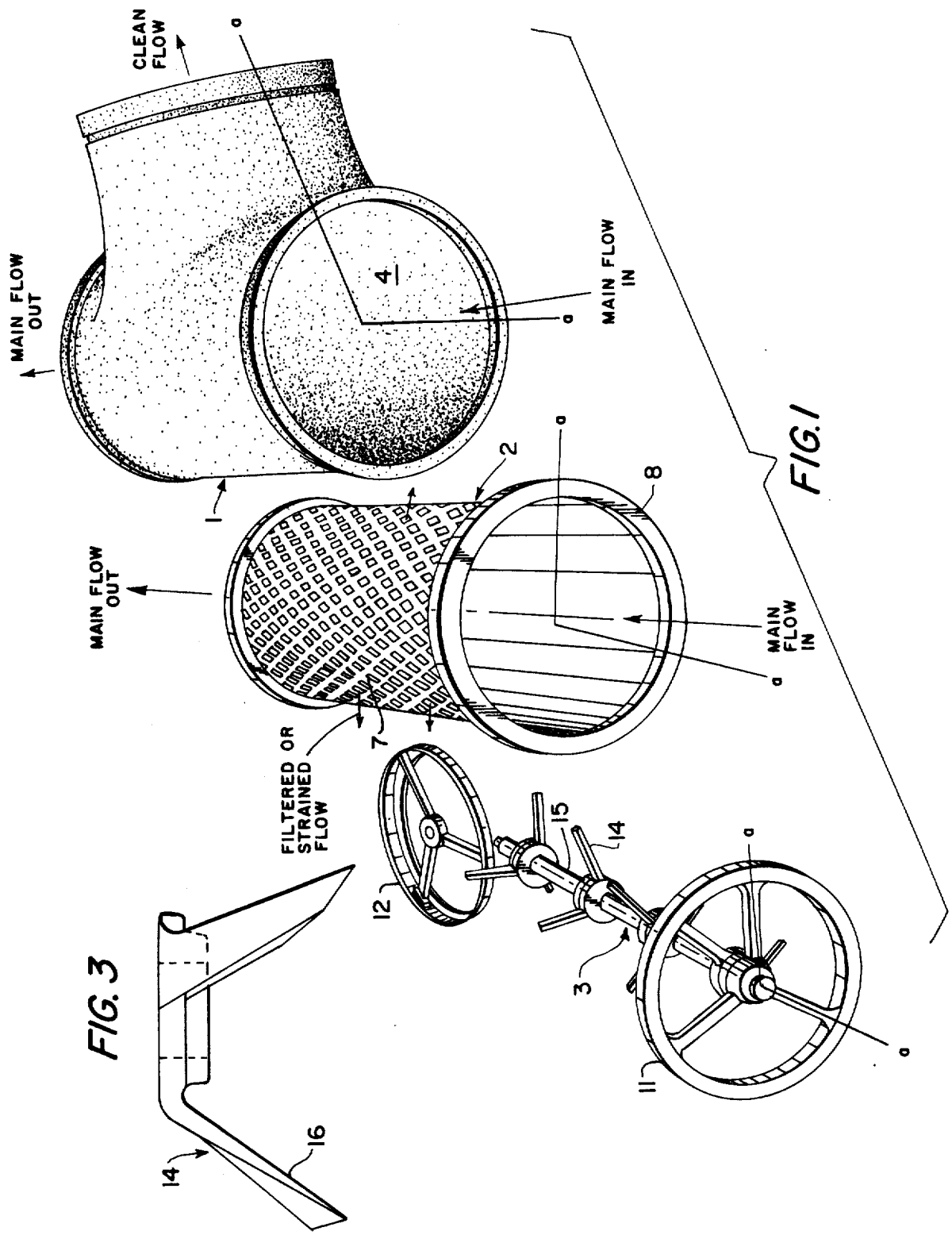
FIG. 1 is an exploded view of the preferred embodiment of the invention.
Figure 2:
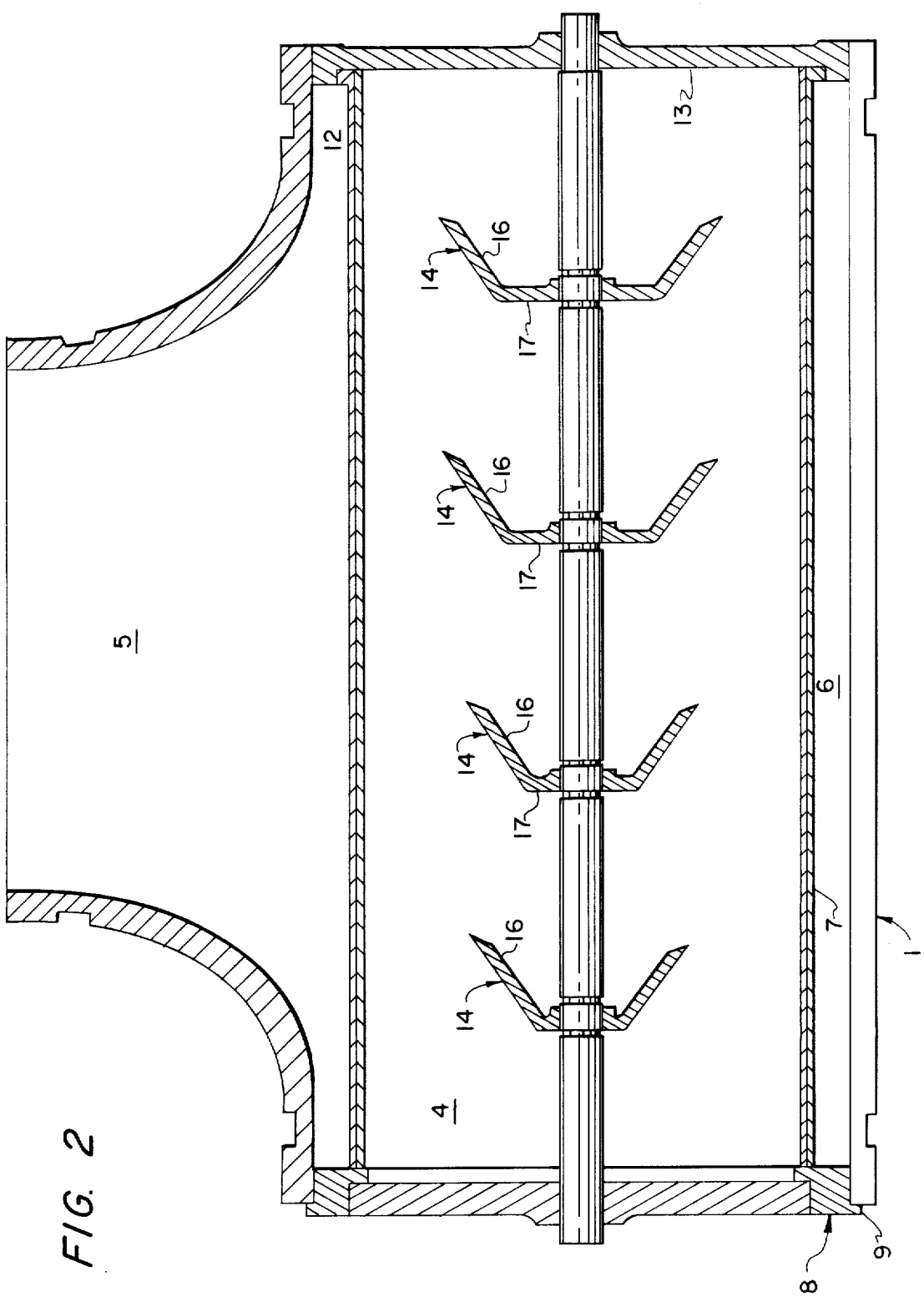
FIG. 2 is a sectional view of the preferred embodiment taken along line a—a of FIG. 1 when viewed as assembled.

In the straining of filtering device shown, separation of a clean stream of fluid from a solid containing main fluid stream is achieved by an assembly of the three principal components shown in FIG. 1. These components consist of a body member 1, a straining or filtering element 2, and an agitating mechanism 3, which are mounted in the concentric fashion illustrated in FIG. 2.

Body member 1 has an axial main flow passage 4 which is open at both ends, and a lateral passage 5 connected thereto for removing the strained fluid. The annular strainer 2, when mounted within passage 4, creates a chamber 6 between its outer surface and the wall of passage 4. The chamber 6 communicates with the passage 5 so that fluid, after passing through the strainer 2, flows around the strainer to passage 5. The strainer 2 can be formed of any conventional porous filtration and/or perforated sieve element 7 and is provided with a retaining ring 8 secured to one end. The ring 8 has a perimetric flange 9 which overlaps the end of one of the longitudinal openings in body member 1. The ring 8 is also provided with an inner flange 10 which receives a hub 11 for supporting one end of the agitator 3. The opposite end of the strainer 2 has a flange 12 that fits within a recess in retainer hub 13 which fits snugly with the other end of passage 4. LIke hub 11, the retainer hub 13 also serves to support an end of agitator 3 by a three-prong spider arrangement (FIG. 1) that allows the free flow of fluid therethrough.

The agitator 3 consists of a series of multi-bladed agitator elements 14 mounted to a shaft 15 which is supported on both ends by the hubs 11, 12. The agitator elements are loosely mounted to the shaft so as to freely rotate under action of fluid passing through the pipe, though they may be secured to the shaft if the shaft is mounted so as to be freely rotatable. It should be noted that, while four agitator elements 14 are shown, the number will vary depending on the length of the straining device.

As is best seen in FIG. 3, the end of each blade is twisted 5° in the same direction, though they could be twisted through any minor angle (a minor angle being defined as one of less than 45°). This twist in combination with the blades being oriented at an angle of about 30° with respect to the axis of the shaft enables the force of the fluid passing through the straining means 2 to cause rotation of the agitating elements 14. This rotative movement creates a turbulent sweeping action of the fluid across the strainer 2 thereby preventing adherence of particles in the fluid to the strainer. Though the device will work satisfactorily with blades 16 of equal radial extent, the sweeping action can be further improved by displacing the blades 16 on each successive agitator element after the first a progressively greater distance radially from the shaft than those on the preceding agitator element. Displacement of the blades 16 can be achieved by extension rings 17 formed integrally with the blades as part of the agitator element.

The operation of the straining device is quite simple, as is readily apparent. Fluid traveling through a line connected to the ring 8 end of body member 1 passes into passage 4 within the strainer 2 and, as it moves towards the opposite end of passage 4, it impinges upon blades 14 which, due to their orientation and twist, are caused to rotate. This rotation of the blades creates a vortex effect which produces a sweeping action of the fluid against the filtration or sieve element 7 preventing adherence of particles thereto as well as creating an inward movement of the particles in the fluid stream towards the center of the flow. A portion of the fluid stream impinging upon the filtration or sieve element 7 passes therethrough into chamber 6 in a cleaned or purified condition, flows about the element 7 and out passage 5, while the major flow continues on out of the strainer.

As can be clearly appreciated, the present invention provides a simple, easy to manufacture, and inexpensive self-cleaning strainer or filter which has unlimited applications. Furthermore, while one embodiment of my invention has been shown and described, it will be apparent that numerous adaptations and modifications may be made without departing from the scope of the appended claims. For example, while only one take-off passage 5 has been shown, a plurality could be provided and, while 3-bladed agitator elements 14 are disclosed, there is nothing critical about the blades numbering three. LIkewise, though a cotter pin securing means is illustrated for attaching shaft 15 to hubs 11, 13, any conventional securing means could be used.

I claim:

1. A self-cleaning strainer comprising a body member having an inner wall defining an axial main flow passage open at both ends and at least one lateral flow passage in communication with said main passage for the removal of strained fluid; annular straining means sealingly mounted within said main passage so as to define a chamber between the outer surface of said straining means and said inner wall of the body member; agitator means mounted within said main flow passage so as to be spaced from said straining means and freely rotatable about the longitudinally axis thereof, said agitator means progressively increasing in diameter from a first inlet end to a second outlet end of said main flow passage, and being configured with respect to said straining means such that the distance between said agitator means and said straining means progressively decreases from said first end to said second end and such that fluid traveling through said straining means will cause it to rotate thereby creating a turbulent fluid flow which will prevent material adhering to said straining means without creating a shearing of said material between said agitator means and said straining means.

2. The self-cleaning strainer of claim 1 wherein said agitator means comprises a plurality of freely rotatable multi-bladed agitator elements.

3. The self-cleaning strainer of claim 2 wherein the blades of said agitator elements have free ends that are twisted in the same direction through a minor angle.

4. The self-cleaning strainer of claim 3 wherein said agitator elements are mounted to central shaft in axially spaced relationship from said first inlet end to said second outlet end of said main flow passage.

5. The self-cleaning strainer of claim 3 wherein the ends of the blades of each successive agitator element, from said first end to said second end, are progressively a greater radial distance from the shaft and a lesser distance from the straining means than those on the preceding agitator element.

6. The self-cleaning strainer of claim 5 wherein all of the blades are of equal length and extend at the same angle relative to the longitudinal axis of the shaft.

7. The self-cleaning strainer of claim 6 wherein the blades extend at angle of approximately 30° with respect to the longitudinal axis of the shaft.

8. The self-cleaning strainer of claim 6 wherein there are at least three of said agitator elements and the blades of said successive agitator elements are radially spaced from said shaft by spacer discs of progressively greater diameter.

* * * * *